United States Patent
Torii

(10) Patent No.: US 8,054,474 B2
(45) Date of Patent: Nov. 8, 2011

(54) IMAGE DATA PRODUCING APPARATUS, IMAGE FORMING APPARATUS AND COMPUTER READABLE MEDIUM

(75) Inventor: Takeshi Torii, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1267 days.

(21) Appl. No.: 11/636,528

(22) Filed: Dec. 11, 2006

(65) Prior Publication Data
US 2008/0007754 A1    Jan. 10, 2008

(30) Foreign Application Priority Data
Jul. 3, 2006  (JP) .................. 2006-183397

(51) Int. Cl.
*G06F 3/12*    (2006.01)

(52) U.S. Cl. ....... 358/1.11; 358/1.16; 358/1.9; 358/448; 358/1.17

(58) Field of Classification Search ........ 358/1.12–1.18, 358/1.11, 1.9, 448
See application file for complete search history.

(56) References Cited

U.S. PATENT DOCUMENTS

| | | | | |
|---|---|---|---|---|
| 5,737,501 A | * | 4/1998 | Tsunekawa | 358/1.2 |
| 5,825,993 A | * | 10/1998 | Shimura et al. | 358/1.16 |
| 5,913,018 A | * | 6/1999 | Sela | 358/1.17 |
| 6,115,131 A | * | 9/2000 | Payne | |
| 2001/0035982 A1 | * | 11/2001 | Otsubo et al. | 358/462 |
| 2004/0061892 A1 | * | 4/2004 | Ferlitsch | 358/1.15 |
| 2004/0095596 A1 | | 5/2004 | Rijavec | |

FOREIGN PATENT DOCUMENTS

| | | | |
|---|---|---|---|
| JP | A-06-168087 | | 6/1994 |
| JP | A-07-172003 | | 7/1995 |
| JP | A-09-091149 | | 4/1997 |
| JP | A-10-097394 | * | 4/1998 |
| JP | A-2003-051019 | * | 2/2003 |
| JP | B2-3555748 | * | 5/2004 |
| JP | A-2004-164645 | | 6/2004 |
| JP | A-2004-192507 | | 7/2004 |
| JP | B2-3589255 | * | 8/2004 |
| JP | A-2006-155308 | | 6/2006 |
| JP | A-2006-159738 | | 6/2006 |

OTHER PUBLICATIONS

Nov. 24, 2010 Office Action issued in Japanese Patent Application No. 2006183397 (with translation).

* cited by examiner

*Primary Examiner* — Chan Park
(74) *Attorney, Agent, or Firm* — Oliff & Berridge, PLC

(57) ABSTRACT

An image data producing apparatus includes: a page dividing portion that divides data described in a page description language into a page unit; a plurality of image processors that form raster data from divided data; and a controlling portion that allocates pages on which the raster data is formed to each of the plurality of the image processors, and causes each of the plurality of the image processors to execute registration of a printing resource on respective pages with at least a change of the printing resource by controlling each of the plurality of the image processors irrespective of a page allocation.

15 Claims, 11 Drawing Sheets

FIG. 3A

PDL DATA

```
JSTART
PSTART
DLFORM 1
LINE
LINE
TEXT
PEND
PSTART
LINE
RECT
DLFONT A
TEXT A
PEND
PSTART
LINE
RECT
TEXT A
LINE
PEND
PSTART
FORM 1
TEXT
TEXT
TEXT
PEND
JEND
```

FIG. 3B

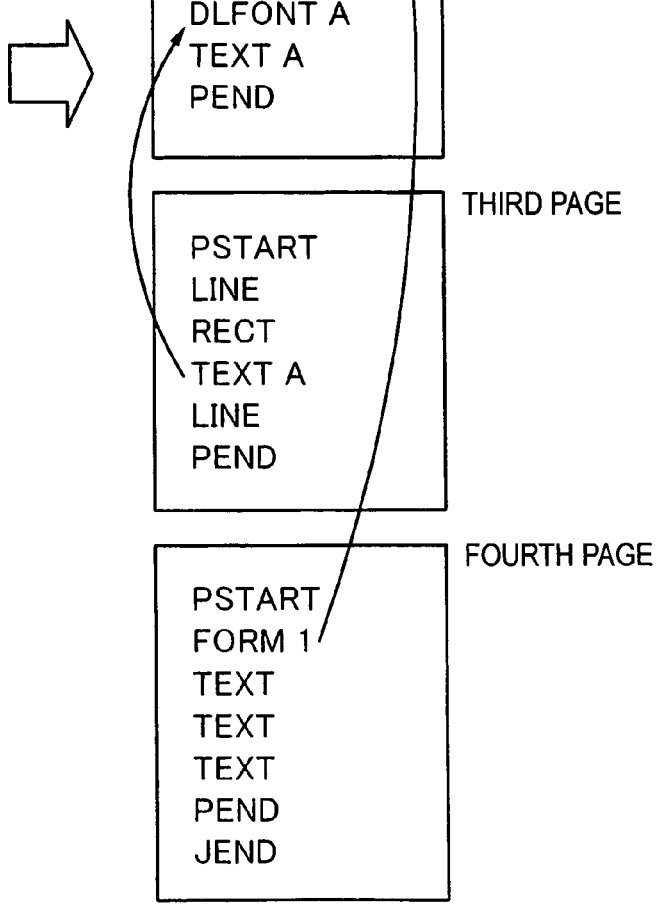

AFTER PAGE DIVISION

FIRST PAGE
```
JSTART
PSTART
DLFORM 1
LINE
LINE
TEXT
PEND
```

SECOND PAGE
```
PSTART
LINE
RECT
DLFONT A
TEXT A
PEND
```

THIRD PAGE
```
PSTART
LINE
RECT
TEXT A
LINE
PEND
```

FOURTH PAGE
```
PSTART
FORM 1
TEXT
TEXT
TEXT
PEND
JEND
```

IMAGE DATA PRODUCING APPARATUS, IMAGE FORMING APPARATUS AND COMPUTER READABLE MEDIUM

BACKGROUND

1. Technical Field

The present invention relates to an image data producing apparatus and an image forming apparatus for producing image data from data described in the page description language (PDL).

2. Related Art

As for the image forming apparatus, various prior arts have been proposed to execute the process at a high speed in forming a raster image (data) from the data described in the page description language.

SUMMARY (1) According to a first aspect of the present invention, an image data producing apparatus includes: a page dividing portion that divides data described in a page description language into a page unit; a plurality of image processors that form raster data from divided data; and a controlling portion that allocates pages on which the raster data is formed to each of the plurality of the image processors, and causes each of the plurality of the image processors to execute registration of a printing resource on respective pages with at least a change of the printing resource by controlling each of the plurality of the image processors irrespective of a page allocation.

According to the present invention constructed as above, following advantages can be achieved.

According to the image data producing apparatus set forth in the item (1), the raster image can be formed at a high speed even from the data described in the page description language such as PostScript (trademark of Adobe Systems Inc. in USA), or the like, which is not page-independent.

BRIEF DESCRIPTION OF THE DRAWINGS

Exemplary embodiment of the present invention will be described in detail based on the following figures, wherein:

FIGS. 3A and 3B are views explaining an approach for dividing PDL data into page units;

DETAILED DESCRIPTION

A best mode for carrying out the invention (referred to as an "embodiment" hereinafter) will be explained in detail with reference to the accompanying drawings hereinafter.

Figure 1:
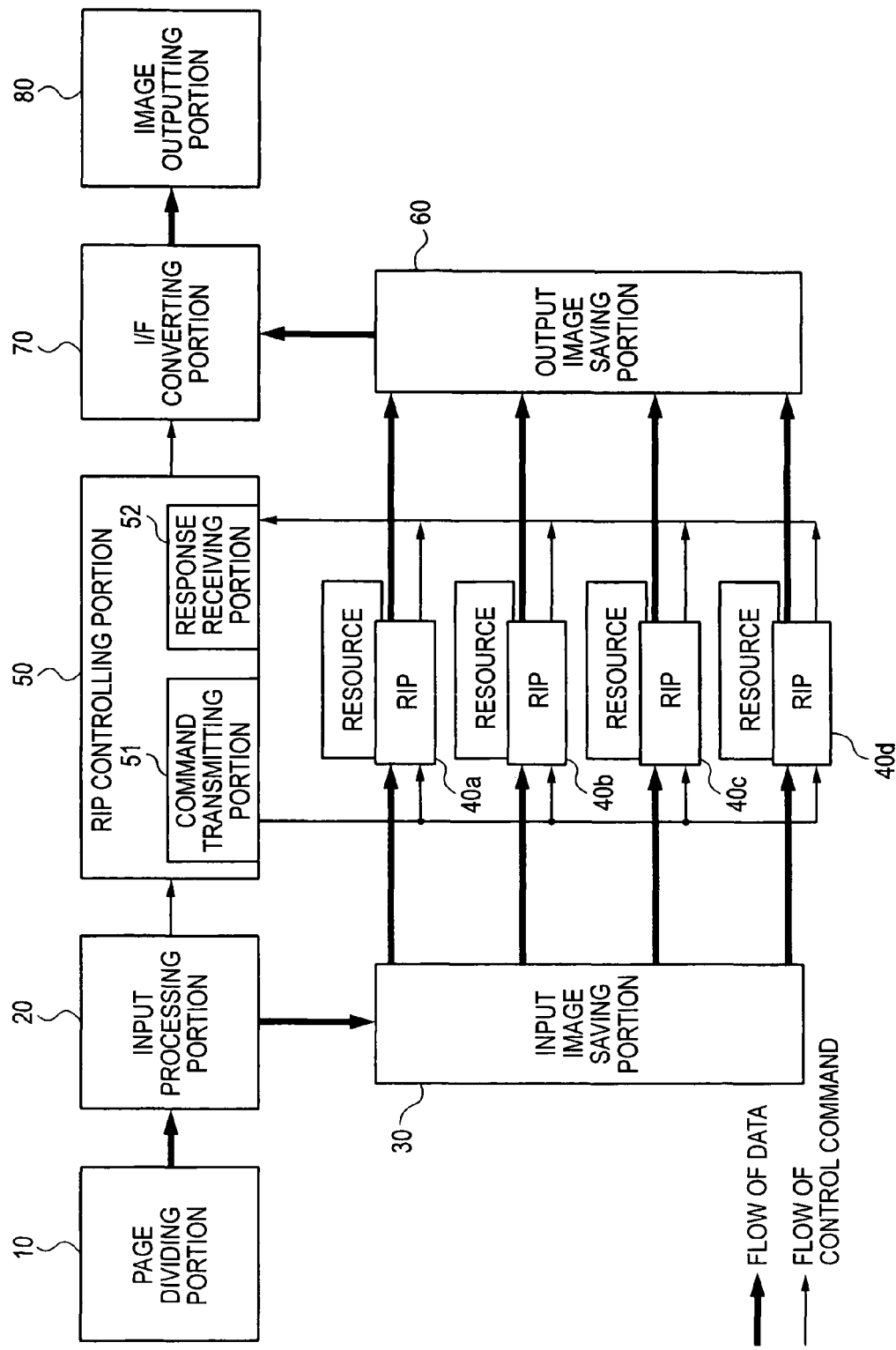
FIG. 1 is a view showing a functional configuration of an image data producing apparatus according to an embodiment of the present invention.

FIG. 1 is a view showing a functional configuration of an image data producing apparatus according to an embodiment of the present invention.

As shown in FIG. 1, the image data producing apparatus according to the present embodiment includes a page dividing portion 10 for dividing the data described in the page description language as the processing object into a page unit, an input processing portion 20, and an input image saving portion 30 for saving the data divided into pages. Also, the image data producing apparatus includes a plurality of raster image processors (RIPs) 40 (40a to 40d) for producing (rasterizing) a raster image from the data saved in the input image saving portion 30, and a RIP controlling portion 50 for controlling operations of the RIPs 40. Also, the image data producing apparatus includes an output image saving portion 60 for saving raster images produced by a plurality of RIPs 40, an I/F (interface) converting portion 70 used to output the raster images to an image forming apparatus, and an image outputting portion 80. In FIG. 1, a thick arrow indicates a flow of data, and a thin arrow indicates a flow of control command.

Figure 2:
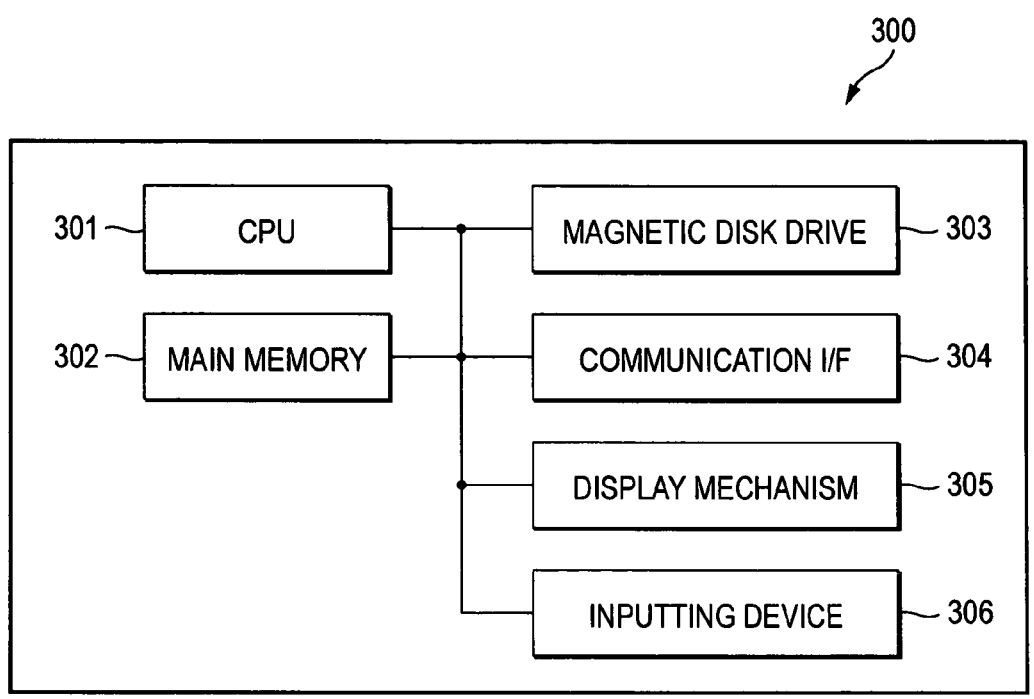
FIG. 2 is a view showing a hardware configuration of a computer suitable to the implement of the image data producing apparatus of the present embodiment.

FIG. 2 is a view showing a hardware configuration of a computer suitable to the implement of the image data producing apparatus.

As shown in FIG. 2, a computer 300 has a CPU (Central Processing Unit) 301 as a calculating means, a main memory 302 as a storing means, and a magnetic disk drive (HDD: Hard Disk Drive) 303. Here, the CPU 301 accomplishes respective functions by executing various softwares such as OS (Operating System), applications, and the like. Also, the main memory 302 is a primary storing means for storing various softwares, data used to execute the software, and the like, and the magnetic disk drive 303 is a secondary storing means for storing input data for various softwares, output data from various softwares, and the like. Further, the computer 300 shown in FIG. 2 has a communication I/F (interface) 304 used to hold communication with the external device, a display mechanism 305 constructed by a video memory, a display, or the like, and an inputting device 306 such as a keyboard, a mouse, or the like. Here, the image data producing apparatus of the present embodiment is equipped with a plurality of RIPs 40. As described in detail, the RIPs 40 are implemented by the computer 300 shown in FIG. 2 and the CPU 301, for example. Therefore, the CPU 301 and the main memory 302, if necessary, are provided in plural to the computer 300 that is used as the image data producing apparatus of the present embodiment.

The page dividing portion 10 shown in FIG. 1 is implemented by the CPU 301 of the computer 300 shown in FIG. 2, for example. This page dividing portion 10 reads the data described in the page description language as the processed object (referred to as "PDL data" hereinafter) and then divides the PDL data into data in page unit (referred to as "page data" hereinafter). The PDL data as the processed object can be acquired by receiving it from the external device or reading it from a predetermined memory device.

FIG. 3 is a view explaining an approach for dividing the PDL data into page units.

As shown in FIG. 3A, the PDL data consists of a list of drawing commands and control commands. For example, "TEXT A" is a command to draw a character by using a font A. Also, "DLFONT A" is a command to instruct that the font A is downloaded into the RIPs 40 and then registered as the printing resource. Also, "PSART" and "PEND" represent a page break respectively, and "PSART" means a start of the page and "PEND" means an end of the page. The page dividing portion 10 divides the PDL data into respective pages based on the control commands "PSART" and "PEND".

When the PDL data shown in FIG. 3A is divided based on the control commands "PSART" and "PEND", the page data to four pages are given, as shown in FIG. 3B. The control commands "DLFORM 1" and "DLFONT A" applied to change the printing resource are contained in the first page and the second page of this page data respectively. The "DLFORM 1" is the command to instruct that a form 1 is downloaded into the RIPs 40 and then registered as the printing resource, and the "DLFONT A" is the command to instruct that the font A is downloaded and then registered, as described above.

Here, when the page data on the third page and the fourth page are referred to, the font A that has been registered on the second page is also used on the third page. Therefore, an image on the third page cannot be formed unless the font A on the second page has been downloaded and registered. Similarly, the form 1 that has been registered on the first page is also used on the fourth page. Therefore, an image on the fourth page cannot be formed unless the form 1 on the first page has been downloaded and registered.

As shown in FIGS. 3A and 3B, most of the PDL data are constructed such that a change of the printing resource, which has been made on a predetermined page, is also utilized in other pages (are not page-independent). Therefore, the page data divided into a page unit cannot be rasterized in parallel as they are by a plurality of RIPs 40. As a result, in order to realize the distributed processing of respective page data, the change of the printing resource made on a predetermined page must be transferred to the RIPs 40 that have not executed the rasterization of the page yet. In the present embodiment, such exchange of this information is implemented under control of the RIP controlling portion 50 described later.

The input processing portion 20 is implemented by the main memory 302 of the computer 300 shown in FIG. 2, for example, and stores the page data divided by the page dividing portion 10 sequentially in the input image saving portion 30. Also, the input processing portion 20 informs the RIP controlling portion 50 that the page data have been stored in the input image saving portion 30.

The input image saving portion 30 is implemented by the main memory 302 or the magnetic disk drive 303 of the computer 300 shown in FIG. 2, for example, and saves the page data fed from the input processing portion 20.

The RIPs 40 are implemented by the CPU 301 and the main memory 302 of the computer 300 shown in FIG. 2, for example, and reads the page data on the page allocated by the input image saving portion 30 under control of the RIP controlling portion 50 to produce the raster image. Also, as described above, the image data producing apparatus of the present embodiment has a plurality of RIPs 40, and individual RIPs 40 are implemented by the separate CPU 301 respectively. Also, the main memory 302 used as the registry area in which the printing resource is registered can be provided in plural together with the RIPs 40, or respective areas that the RIPs 40 use can be can be set in a single main memory 302.

The RIP controlling portion 50 is implemented by the CPU 301 and the main memory 302 of the computer 300 shown in FIG. 2, for example, and instructs respective RIPs 40 to rasterize the page data and register the printing resource. As shown in FIG. 1, the RIP controlling portion 50 has a command transmitting portion 51 for transmitting the instruction command to respective RIPs 40, and a response receiving portion 52 for receiving a response from respective RIPs 40. Then, the RIP controlling portion 50 executes dynamically the allocation of the page data to respective RIPs 40 based on the responses that response receiving portion 52 accepts from respective RIPs 40, to reduce a waiting time for the processing in individual RIPs 40. Concrete control contents of the RIP controlling portion 50 will be described later.

The output image saving portion 60 is implemented by the main memory 302 or the magnetic disk drive 303 of the computer 300 shown in FIG. 2, for example, and saves the raster image produced by the RIPs 40.

The I/F converting portion 70 is implemented by the CPU 301 of the computer 300 shown in FIG. 2, for example. This I/F converting portion 70 reads the saved raster image from the output image saving portion 60 under control of the RIP controlling portion 50, and converts a data format into a format that the image forming apparatus such as a printer, or the like can handle.

The image outputting portion 80 is implemented by the communication I/F 304 of the computer 300 shown in FIG. 2, for example, and transmits the data converted by the I/F converting portion 70 to the image forming apparatus.

Next, control of the RIP controlling portion 50 will be explained in detail hereunder.

Figure 4:
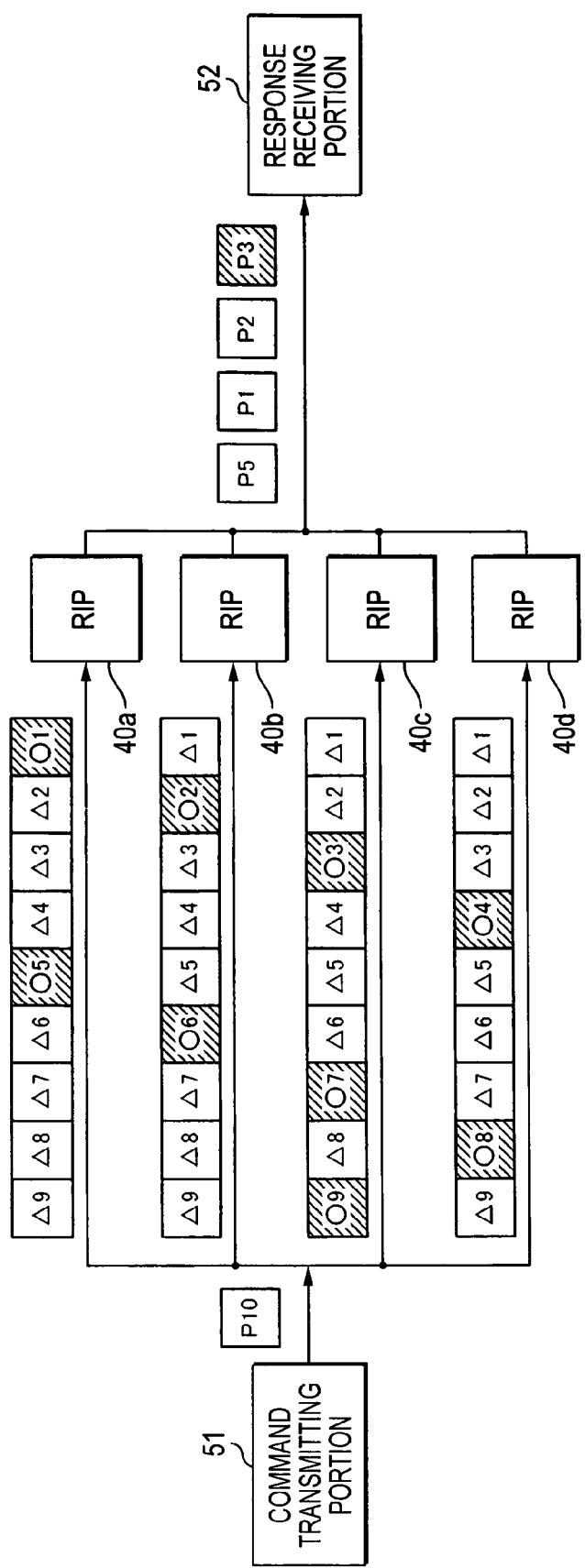
FIG. 4 is a view showing a behavior of allocating page data to respective RIPs in the present embodiment.

FIG. 4 is a view showing a behavior of allocating page data to respective RIPs in the present embodiment. Here, suppose that a distributed processing of page data is executed by four RIPs 40 from a RIP 40a to a RIP 40d.

The RIP controlling portion 50 sends the operation instruction commands for respective page data from the command transmitting portion 51 to respective RIPs 40a to 40d, based on the notice from the input processing portion 20. At this time, the RIP controlling portion 50 instructs one RIP 40 to execute the rasterization of individual page data (page data that are marked with a circle (○) in FIG. 4). Also, the RIP controlling portion 50 instructs remaining RIPs 40 to execute only the registration of the printing resource (page data that are marked with a triangle (Δ) in FIG. 4). It is preferable that the allocation of the page to which the rasterization is applied should be decided at least initially in unit of several pages. This is because, if the RIP controlling portion 50 allocates the next page data every time when each RIP 40 finishes the rasterization of one page and then the RIP 40 reads the allocated page data, an execution efficiency becomes low. When respective RIPs 40 read the page data of several pages in advance and execute continuously the rasterization, the execution efficiency can be improved.

In the example shown in FIG. 4, the page data serving as the object of rasterization is allocated respective RIPs 40 by two pages. Concretely, the rasterization of the first page (P1) and the fifth page (P5) is allocated to the RIP 40a, the rasterization of the second page (P2) and the sixth page (P6) is allocated to the RIP 40b, the rasterization of the third page (P3) and the seventh page (P7) is allocated to the RIP 40c, and the rasterization of the fourth page (P4) and the eighth page (P8) is allocated to the RIP 40d (the ninth page (P9) will be described later). Accordingly, in respective pages, remaining RIPs 40 (e.g., the RIPs 40b to 40d in the first and fifth pages) are instructed only to register the printing resource.

Here, the operations of respective RIPs 40b to 40d are considered as an example of the page data shown in FIG. 3B. As to the first page, the RIP 40a produces the raster image of the first page because it is instructed to execute the rasterization. At that time, of course the RIP 40a downloads and registers the form 1. The RIPs 40b to 40d do not produce the raster image but download and register the form 1 because they are instructed only to register the printing resource. Therefore, the form 1 is registered in all the RIPs 40a to 40d. As a result, the production of the raster image using the form 1 can be carried out without any trouble in the RIP 40d that rasterizes the fourth page in which the form 1 is used.

Similarly, as to the second page, the RIP 40a produces the raster image of the second page and downloads and registers the font A because it is instructed to execute the rasterization. The RIPs 40a, 40c, 40d do not produce the raster image but download and register the font A because they are instructed only to register the printing resource. Therefore, the font A is registered in all the RIPs 40a to 40d. As a result, the production of the raster image using the font A can be carried out without any trouble in the RIP 40c that rasterizes the third page in which the font A is used.

Respective RIPs 40a to 40d produce the raster image of the page data allocated to their own devices and store the image in the output image saving portion 60, as described above, and also notify the RIP controlling portion 50 that the rasterization has been finished. When the response receiving portion 52 of the RIP controlling portion 50 receives this notice, the RIP controlling portion 50 allocates the page data on the ninth page et seq. The page data have a different time required for the rasterization in response to the contents respectively. Accordingly, when the distributed processing of respective page data is executed by a plurality of RIPs 40, the rasterization is not always finished in order of pages of the original PDL data. In the example in FIG. 4, the notice to the effect that the rasterization has been completed is sent to the response receiving portion 52 in order of the third page, the second page, the first page, and the fifth page. Therefore, in order to equalize differences in the processing times in the RIPs 40a to 40d, the RIP controlling portion 50 allocates the rasterization to the ninth page et seq. such that the page number to wait for the rasterization is made equal in the RIPs 40a to 40d. In the example in FIG. 4, the rasterization of the next ninth page is allocated to the RIP 40c that has finished first the rasterization of the page data (third page) of one page. After this, the rasterization may be allocated similarly every one page or the rasterization may be allocated in unit of two pages like the initialization. In the former case, the tenth page is allocated to the RIP 40b that that has finished second the rasterization of the page data (second page) of one page. In the latter case, the tenth page (P10) is also allocated to the RIP 40c together with the ninth page.

Also, the RIP controlling portion 50 manages the rasterization of the page data by using the page index. This page index acts as the pointer to the memory area in which the raster image of each image is stored in the output image saving portion 60. As the attributes of the page index, there are at least the next form page pointing the page data (to which generation of the raster image is allocated) that is rasterized next, and the next transmit page pointing the raster image that is sent out next to the image forming apparatus.

Figure 5:
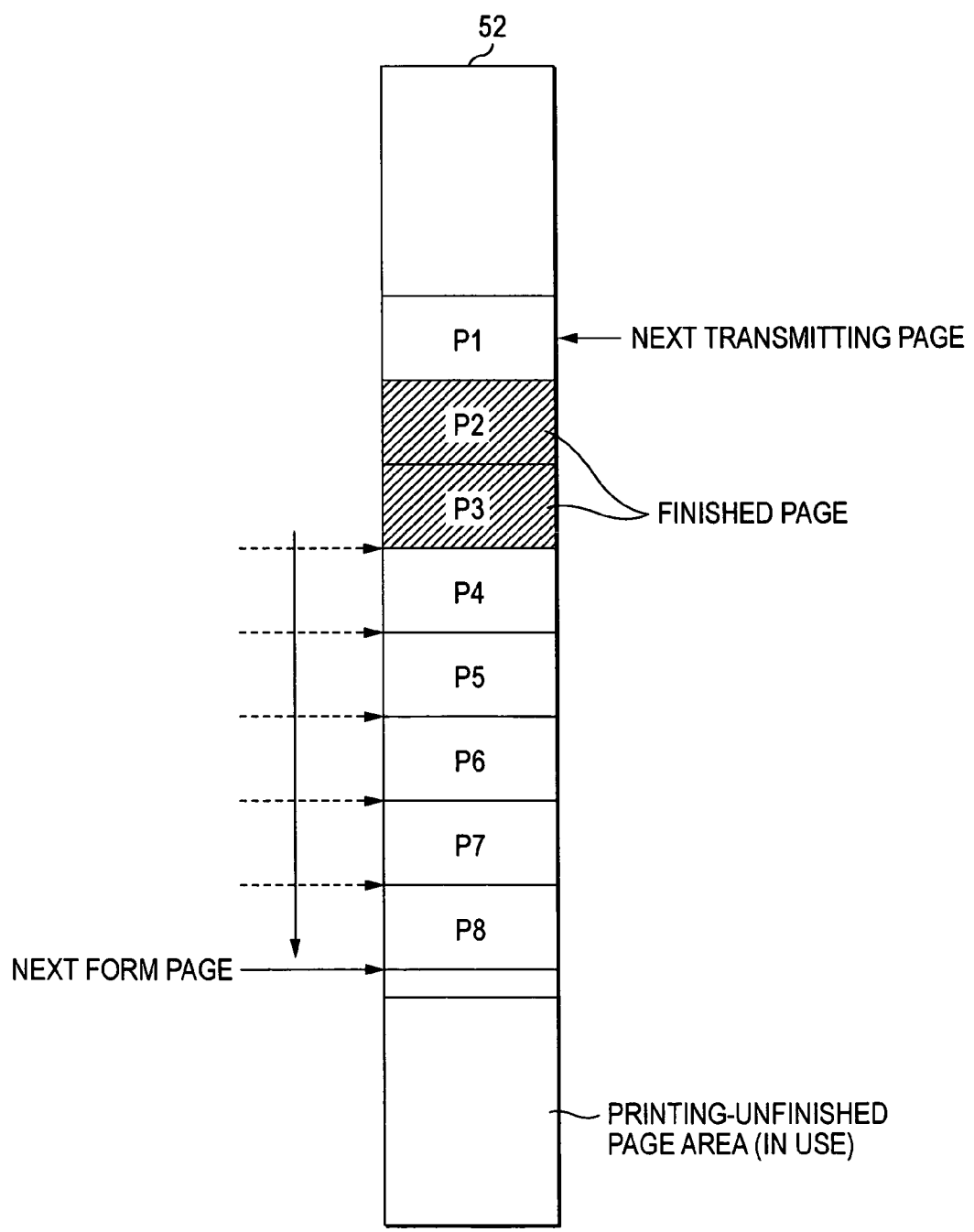
FIG. 5 is a view explaining a page managing method in terms of page index in the present embodiment.

FIG. 5 is a view explaining a page managing method in terms of the page index. In FIG. 5, the rasterization of the second page and the third page has been finished, and raster images are written into the concerned memory areas (in FIG. 5, shown in gray) by the allocated RIP 40 (in the example in FIG. 4, RIPs 40b, 40c).

The RIP controlling portion 50 searches the memory area of the output image saving portion 60. When the unused area whose size exceeds the size specified by the page attribute of the page data is found at the address pointed by the page index of the next form page, this RIP controlling portion 50 sets the buffer offset to the instruction command that is sent to the RIPs 40 and puts forward the instruction point of the next form page to the extent of a required size. Because the area is pointed in order of page in this manner, the rasterized image is formed in the successive area of the main memory 302, or the like as the output image saving portion 60.

When the area pointed by the next form page of the page index is in use (other (preceding) rasterized pages have been saved but have not been printed yet), such area cannot be used upon saving the rasterized image and hence the transmission of the instruction command to the RIPs 40 is set in its standby state. Normally, the area in use is released at a timing at which the final output from the image forming apparatus could be confirmed after the raster image saved in the area in use is printed. Therefore, when the usable area obtained by adding a current free area and the released area is larger than the size required for the page attributes, the RIP controlling portion 50 sends the instruction command indicating a standby state to the allocated RIP 40.

Also, the RIP controlling portion 50 notifies the I/F converting portion 70 of the information about the pages whose rasterization is finished. The I/F converting portion 70 reads the rasterized image of the pages whose rasterization is finished from the output image saving portion 60 based on this notice, then converts the data format, and then outputs the resultant data to the image forming apparatus. At this time, the notice from the RIP controlling portion 50 to the I/F converting portion 70 is not executed in order of completion of the rasterization but in order of page. In the example shown in FIG. 5, the rasterization of the second page and the third page has been finished, but the rasterization of the first page has not been finished. Therefore, the page index for the next transmit page is still pointing the area in which the first page is saved, and the RIP controlling portion 50 does not notify the I/F converting portion 70 of not only the first page but also the second and third pages.

Then, when the RIP 40 notifies the response receiving portion 52 of the RIP controlling portion 50 that the rasterization of the first page has been finished, the RIP controlling portion 50 notifies the I/F converting portion 70 sequentially that the rasterization of the first, second, and third pages has been finished. Then, the I/F converting portion 70 reads the first, second, and third pages sequentially to process them. In contrast, after the rasterized images of the first, second, and third pages are read and output from the image forming apparatus, the RIP controlling portion 50 releases the area of the output image saving portion 60 in which the rasterized images of the same pages are saved, and then puts forward the instruction point of next transmit page to the area in which the fourth page is saved.

Figure 6:
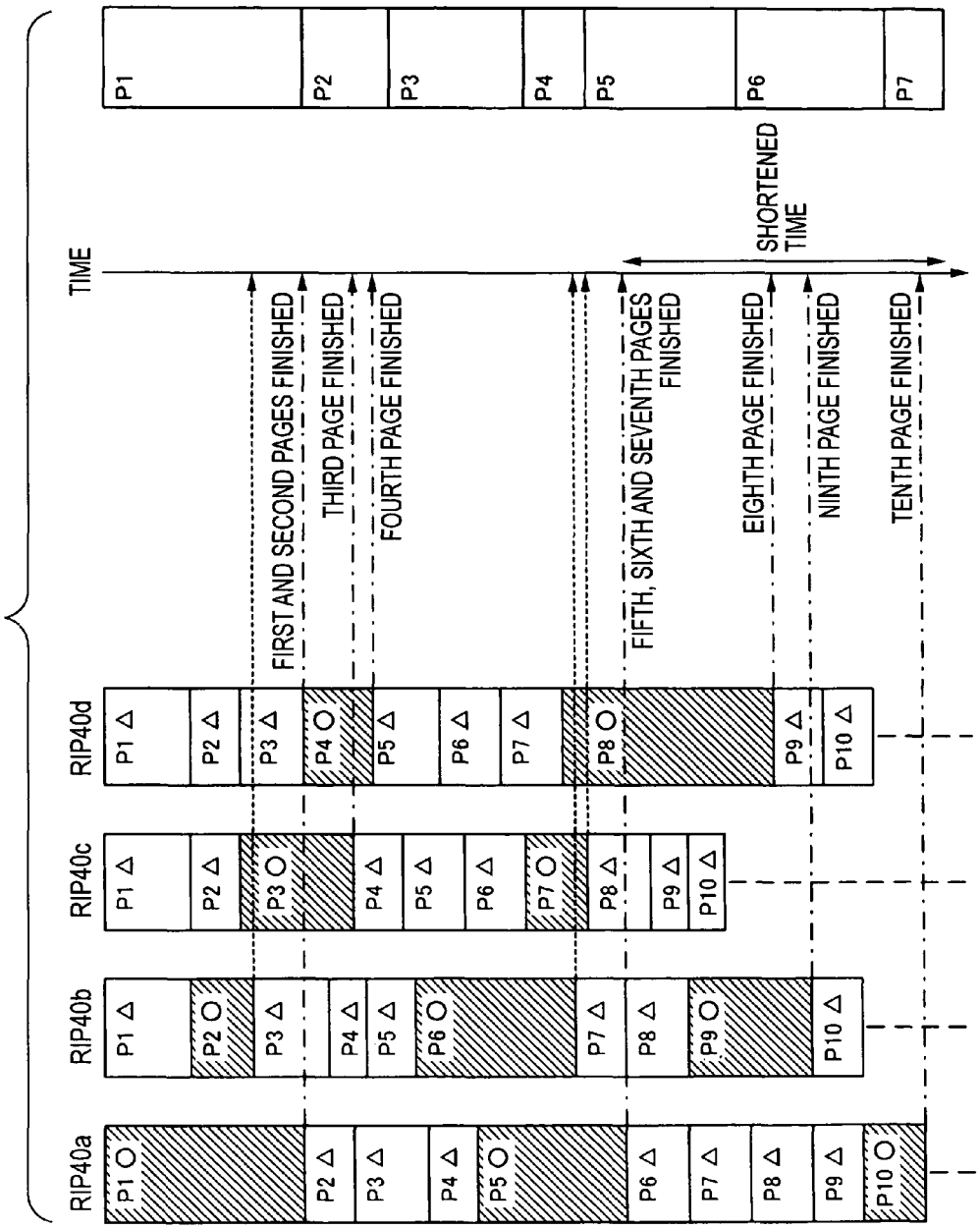
FIG. 6 is a time chart comparing respective processing times required when page data are rasterized in parallel by a plurality of RIPs in the present embodiment and when each page data are rasterized sequentially by a single RIP.

FIG. 6 is a time chart comparing respective processing times required when page data are rasterized in parallel by a plurality of RIPs 40 in the present embodiment and when each page data are rasterized sequentially by a single RIP. Here, an example in which the process is executed by four RIPs 40a to 40d in accordance with the allocation shown in FIG. 4 is given.

When respective RIPs 40a to 40d apply the processing to the same page data, a time required to execute the registration of the printing resource only is of course shorter than a time required to produce the raster image. Therefore, when referring to FIG. 6, the RIP 40b finishes the processing of the first page and starts the rasterization of the second page while the RIP 40a is rasterizing the first page. Similarly, the RIP 40c finishes the processing of the first and second pages and starts the rasterization of the third page while the RIP 40b is rasterizing the second page. Also, the RIP 40d finishes the first to third pages and starts the rasterization of the fourth page while the RIP 40c is rasterizing the third page.

Now, as described above, the management in order of page is still kept in managing the rasterized image in the RIP controlling portion 50. Therefore, as shown in FIG. 6, when the rasterization of the second page by the RIP 40b is finished earlier than the rasterization of the first page by the RIP 40a, the RIP controlling portion 50 does not recognizes that the rasterization has been finished at a time point when the processing in the RIP 40b is ended, and then decides that the rasterization of the first and second pages has been finished at a time point when the processing in the RIP 40a is ended. In FIG. 6, an end time of the processing in the RIP 40b is indicated by a broken line and is discriminated from other end times (indicated by a dot-dash line) (this is similar to the processing of the sixth and seventh pages).

In contrast, when the rasterization of respective page data is executed in seriatim by a single RIP, a time required for the rasterization of respective page data is added simply. Therefore, as shown in FIG. 6, a time required until the rasterization of respective page data subsequent to the second page is finished can be shortened when the distributed processing is applied by a plurality of RIPs 40.

Next, a variation of the above control of the RIP controlling portion 50 will be explained hereunder.

The page dividing portion 10 can also check other commands described in the PDL data when it senses the control command representing a page break used to divide the PDL data into a page unit. Therefore, the page dividing portion 10 attaches identification data (flag, or the like) indicating such an effect that the printing resource is changed, to the page data on the page. As a result, the RIP controlling portion 50 can discriminate whether or not the printing resource is changed in each page data.

The RIP controlling portion 50 can discriminate previously the page whose printing resource was changed before it allocates the page data as the object of rasterization to respective RIPs 40. Therefore, the RIP controlling portion 50 can instruct the RIPs 40 except the RIP 40, to which this RIP controlling portion 50 allocated the execution of the rasterization, to register the printing resource only in the page data whose printing resource was changed.

Figure 7:
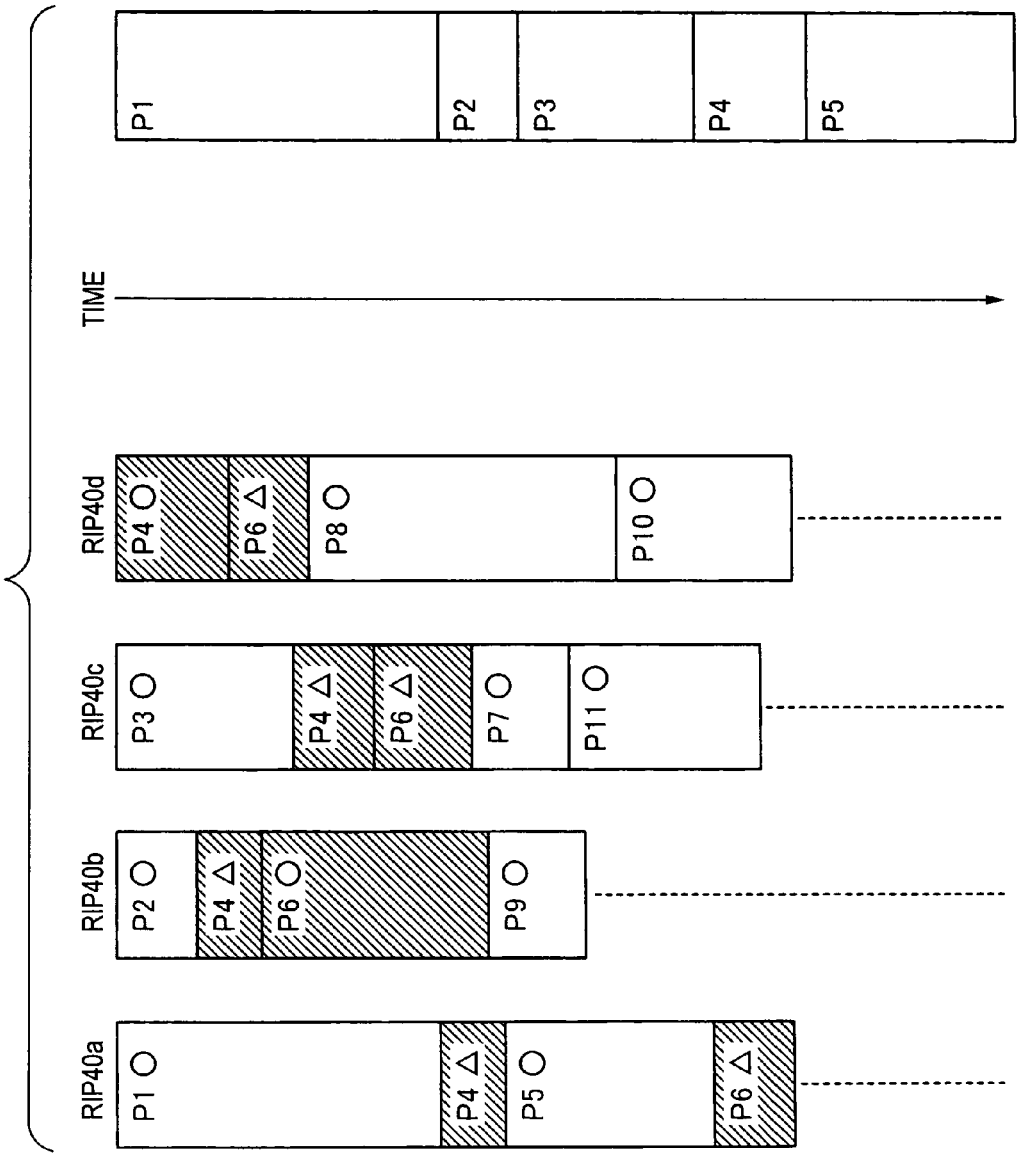
FIG. 7 is a time chart showing operation timings of respective RIPs when page data are rasterized in parallel by a plurality of RIPs in a variation of the present embodiment.

FIG. 7 is a time chart showing operation timings of respective RIPs 40 when page data are rasterized in parallel by a plurality of RIPs 40 in a variation of the present embodiment. Here, an example in which the processing is executed by four RIPs 40a to 40d while using the page data whose print resources on the fourth page and the sixth page are changed as an example is shown.

Referring to FIG. 7, with regard to the first to third, fifth pages, etc. on which no change is made on the printing resource, only the instruction to execute the rasterization is given to the allocated RIPs 40a to 40d. Also, with regard to the fourth page on which the change of the printing resource is made, not only the execution of the rasterization is allocated to the RIP 40d but also the execution of the registration of the printing resource is allocated to the RIPs 40a to 40c. Similarly, with regard to the sixth page, not only the execution of the rasterization is allocated to the RIP 40b but also the execution of the registration of the printing resource is allocated to the RIPs 40a, 40c, 40d.

As described above, in the RIPs 40 that do not execute the rasterization, the pages on which the printing resource should be registered can be restricted only to the pages on which the printing resource is changed. Therefore, the number of times the registration of the printing resource is executed by respective RIPs 40 can be reduced.

Next, another variation of the control of the above RIP controlling portion 50 will be explained hereunder.

In the present variation, the RIP controlling portion 50 instructs respective RIPs 40 to execute the rasterization of respective pages in a distributive mode without regard to the change of the printing resource. Then, respective RIPs 40 inform the RIP controlling portion 50 of the completion of the rasterization, and also transmits such information to the RIP controlling portion 50 when the printing resource is changed in the course of the rasterization. When the RIP controlling portion 50 received the information regarding the change of the printing resource from a predetermined RIP 40, it ignores the notice of completion of the rasterization of pages subsequent to the page whose printing resource was changed. Then, the RIP controlling portion 50 causes remaining RIPs 40 to copy the received change of the printing resource. Then, the RIP controlling portion 50 instructs the RIPs 40 again to execute the rasterization of pages subsequent to the page whose printing resource was changed.

Figure 8:
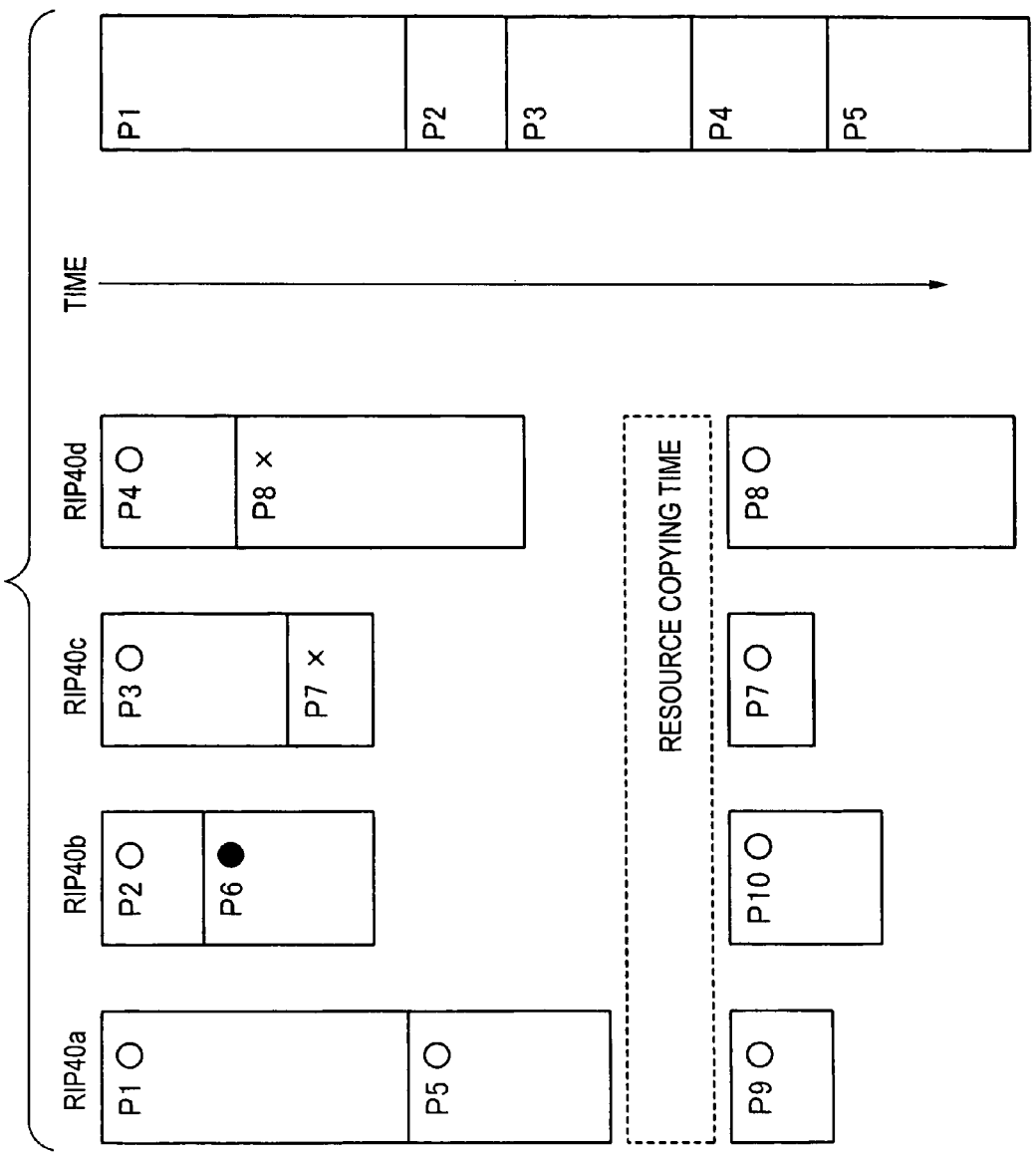
FIG. 8 is a time chart showing operation timings of respective RIPs when page data are rasterized in parallel by a plurality of RIPs in another variation of the present embodiment.
Figure 9:
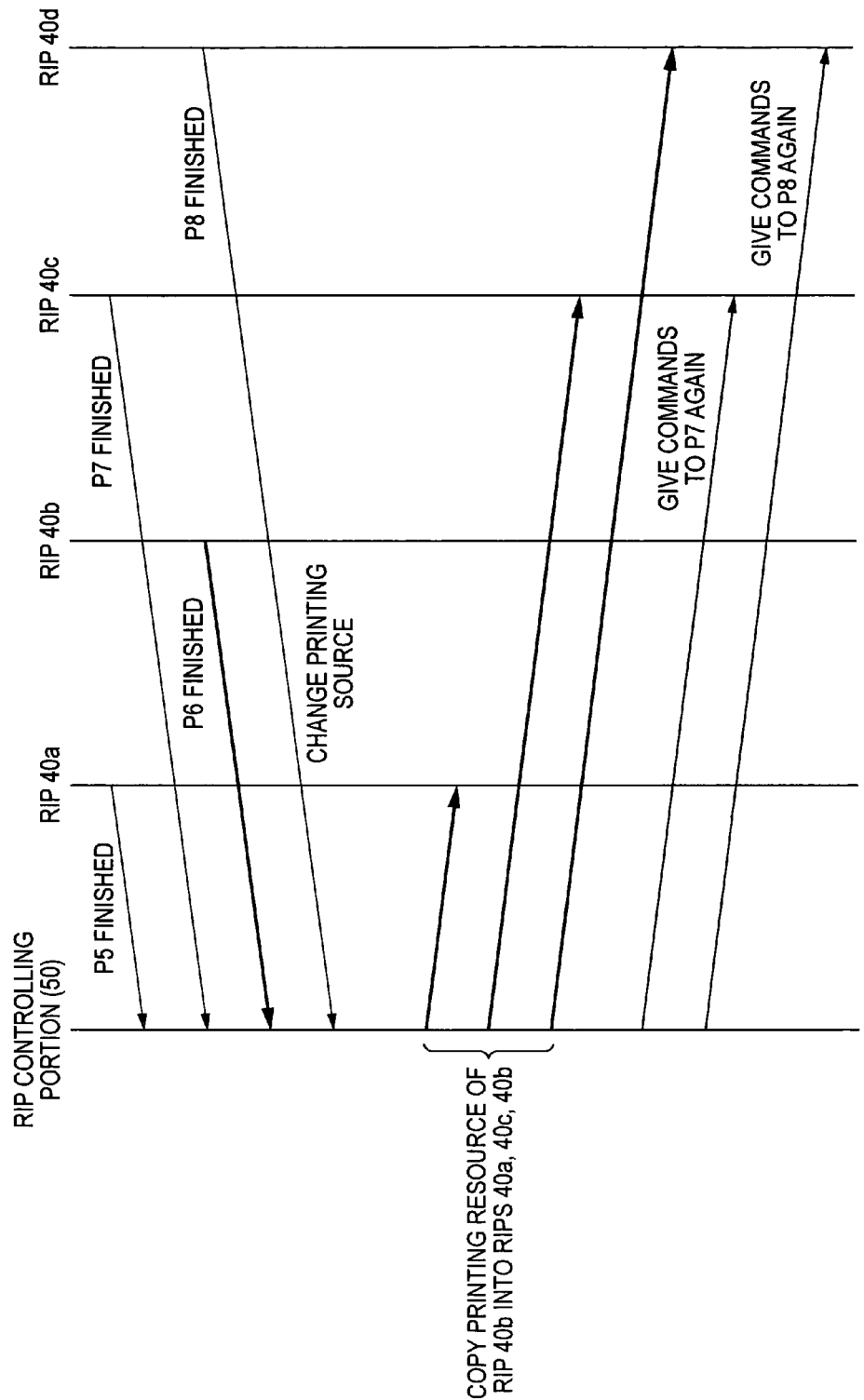
FIG. 9 is a time chart showing a behavior of communication between respective RIPs and a RIP controlling portion in the example in FIG. 8.

FIG. 8 is a time chart showing operation timings of respective RIPs 40 when page data are rasterized in parallel by a plurality of RIPs 40 in present variation. FIG. 9 is a time chart showing a behavior of communication between respective RIPs 40a to 40d and the RIP controlling portion 50.

In the example shown in FIG. 8, the change of the printing resource is made (in FIG. 8, indicated by a black mark (●)) when the RIP 40b rasterized the sixth page, and then the notice of the change of the printing resource as well as the notice of completion of the rasterization of the sixth page is transmitted from the RIP 40b to the RIP controlling portion 50 (in FIG. 9, indicated with a thick arrow).

Since the change of the printing resource was made on the sixth page, the RIP controlling portion 50 ignores the notice of completion of the rasterization of the seventh and eighth pages subsequent to the sixth page (in FIG. 8, indicated by a cross (x)). Here, the RIP controlling portion 50 received the notice about the seventh page prior to the notice of completion of the rasterization of the sixth page. However, as explained with reference to FIG. 6, in order to keep the management in order of page, the RIP controlling portion 50 does not recognize the completion of the rasterization of the seventh page until the rasterization of the sixth page is finished, and therefore the notice about the seventh page is also ignored.

Then, the RIP controlling portion 50 causes remaining the RIPs 40a, 40c, 40d to copy the contents of the registration of the printing resource executed during the rasterization of the sixth page in the RIP 40b, and then instructs the RIP 40c, 40d again to rasterize the seventh and eighth pages. With regard to the ninth page et seq., the RIP controlling portion 50 must instruct to execute the rasterization again if such RIP controlling portion 50 instructed to execute the rasterization prior to the change of the printing resource. However, the RIP controlling portion 50 may instruct to execute the rasterization as the routine operation if such RIP controlling portion 50 instructs to execute the rasterization after the change of the printing resource.

Figure 10:
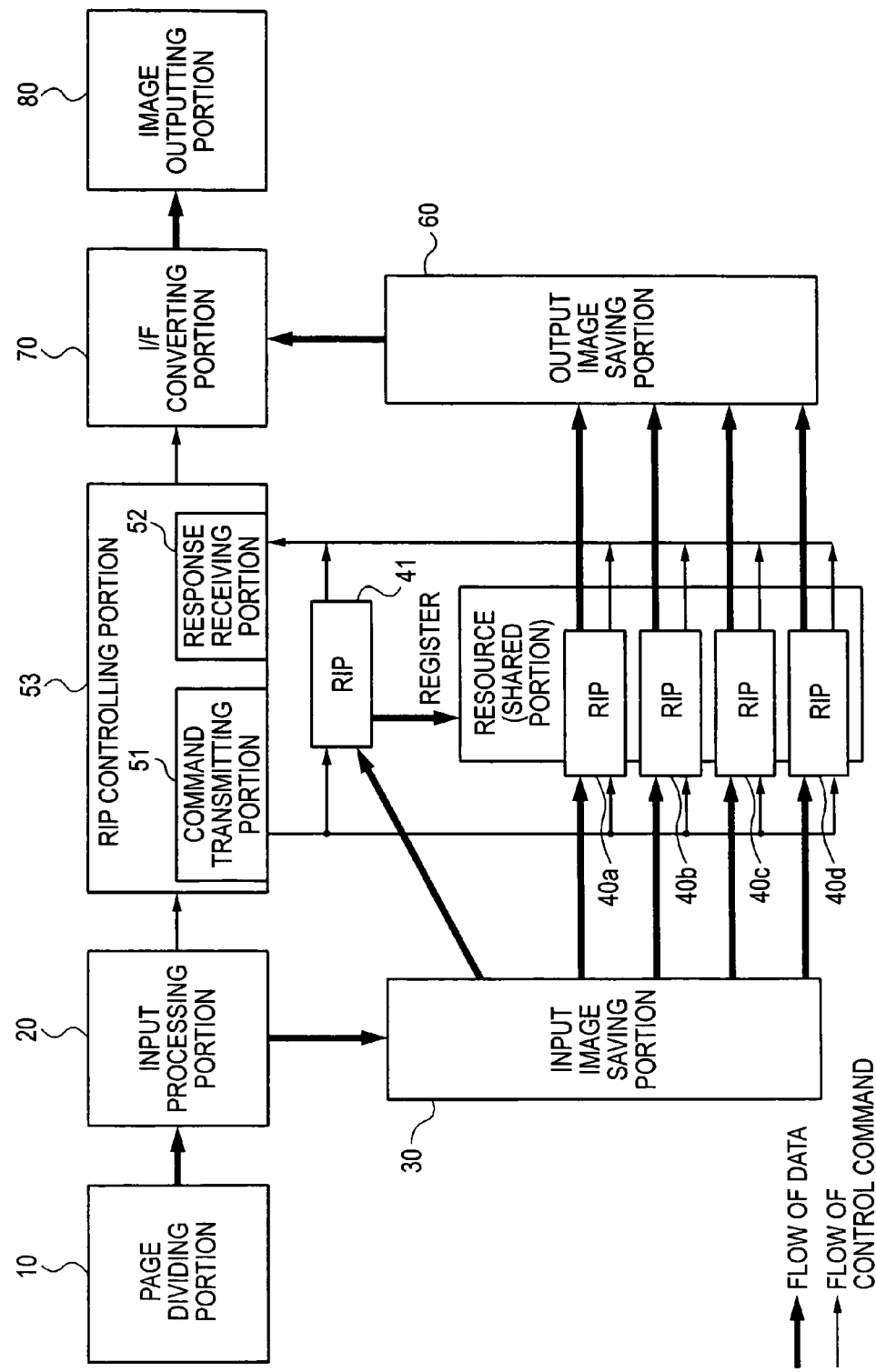
FIG. 10 is a view showing a functional configuration of an image data producing apparatus in another embodiment of the present invention.

FIG. 10 is a view showing a functional configuration of the image data producing apparatus in another embodiment of the present invention.

As shown in FIG. 10, the image data producing apparatus in the present embodiment includes the page dividing portion 10 for dividing the data described in the page description language as the processed object into a page unit, the input processing portion 20, and the input image saving portion 30 for saving the data divided every page. Also, the image data producing apparatus includes a plurality of raster image processors (RIPs) 40, 41 for producing (rasterizing) the raster image from the data saved in the input image saving portion 30, and a RIP controlling portion 53 for controlling operations of the RIPs 40, 41. Also, the image data producing apparatus includes the output image saving portion 60 for saving the raster image produced by a plurality of RIPs 40, the I/F (interface) converting portion 70 used to output the raster image to the image forming apparatus, and the image outputting portion 80.

In the configuration shown in FIG. 10, the page dividing portion 10, the input processing portion 20, the input image saving portion 30, the output image saving portion 60, the I/F converting portion 70, and the image outputting portion 80 are similar to the corresponding constituent elements shown in FIG. 1. Therefore, the same reference symbols are affixed to these constituent elements, and their explanation will be omitted herein. Also, like the apparatus shown in FIG. 1, the image data producing apparatus shown in FIG. 10 is implemented by the computer constructed as shown in FIG. 2, for example.

The RIPs 40 shown in FIG. 10 are substantially similar to the RIPs 40 shown in FIG. 1. However, in the present embodiment, respective RIPs 40 execute the rasterization of the page data while sharing the printing resource that is registered in a single memory area in a single main memory 302.

The RIP 41 executes the registration of the printing resource in all page data. In other words, the printing resource is registered in the shared area of the main memory 302 by the RIP 41, and is utilized in the processing of respective RIPs 40.

Like the RIP controlling portion 50 shown in FIG. 1, the RIP controlling portion 53 allocates the page data to which the rasterization is applied to respective RIPs 40. In this case, in the present embodiment, the RIP controlling portion 53 instructs only the RIP 41 to register the printing resource, as described above. Therefore, the RIP controlling portion 53 instructs respective RIPs 40 only to produce the raster image in response to the allocated page data.

Figure 11:
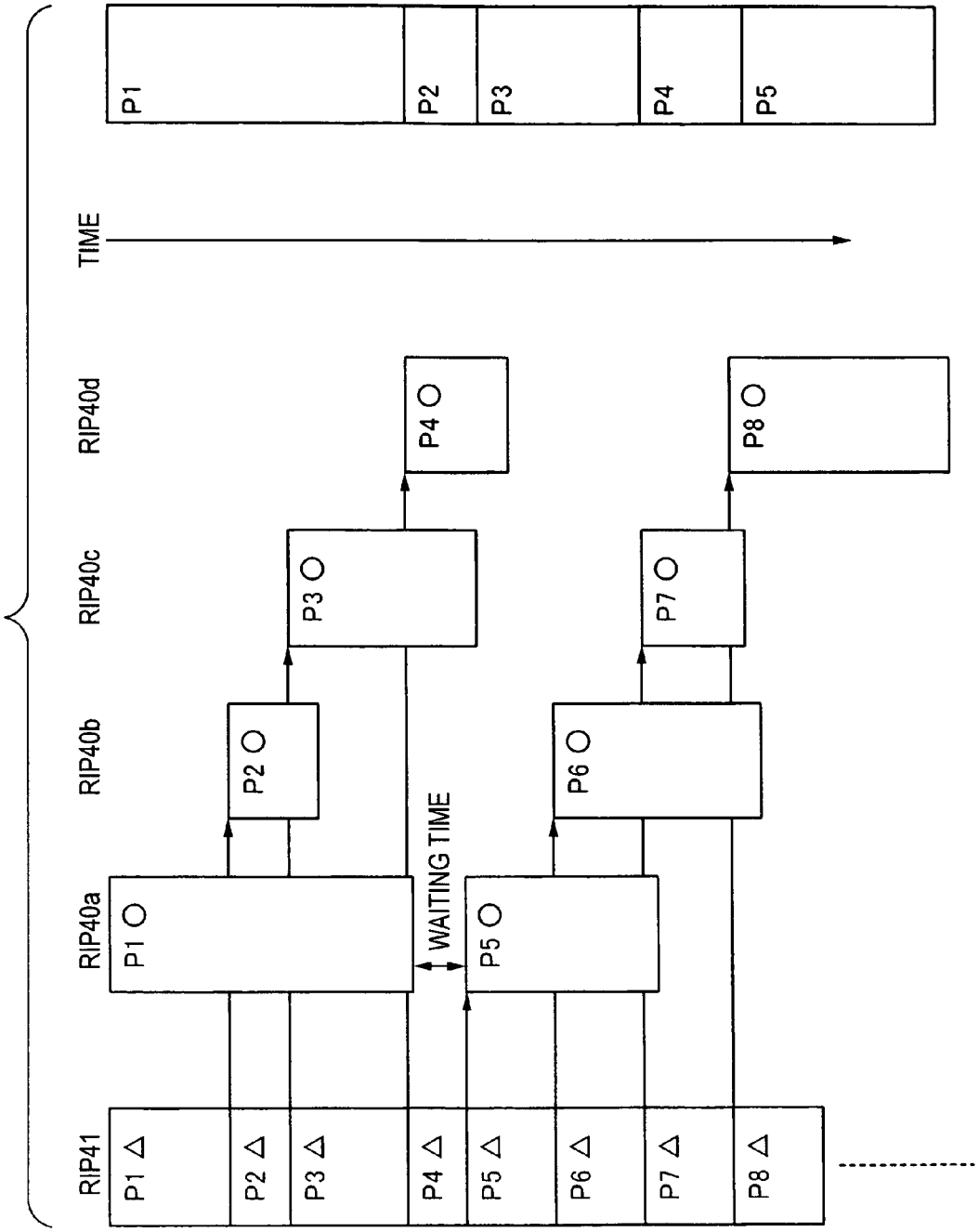
FIG. 11 is a time chart showing operation timings of respective RIPs when page data are rasterized in parallel by a plurality of RIPs in the present embodiment.

FIG. 11 is a time chart showing operation timings of respective RIPs 40 when page data are rasterized in parallel by a plurality of RIPs 40 in the present embodiment.

Referring to FIG. 11, the registration of all printing resources is executed by the RIP 41. Then, only the rasterization of the page data allocated to them is executed in the RIPs 40a to 40d. Here, the rasterization of each page data is executed at a timing at which the registration of the printing resource of the corresponding pages is executed by the RIP 41. This is because the rasterization is executed with reference to the contents of the registration of the printing resource executed by the RIP 41.

In the example shown in FIG. 11, the registration of the printing resource on the fifth page is not executed by the RIP 41 at a time point when the rasterization of the first page is finished in the RIP 40a, for example. Therefore, the rasterization of the fifth page cannot be started immediately and then a waiting time is generated. Similarly, a waiting time is generated in the RIPs 40b to 40d until the rasterization of the subsequent page is started after the rasterization of the preceding page is finished. In the initial stage of the job, the registration of the printing resource executed by the RIP 41 cannot follow up a processing speed of the parallel rasterization executed by a plurality of RIPs 40, and as a result such waiting time is generated. However, as described above, since a time required for the registration of the printing resource is shorter than a time required for the rasterization of the same page, such waiting time is shortened with the progress of the job. Then, a waiting time in the processing of respective RIPs 40 is never generated thereafter after the registration of the printing resource executed by the RIP 41 is finished.

With the above, explanation is made while taking as an example the case where the image data producing apparatus is constructed as the independent apparatus from the image forming apparatus such as a printer, or the like. But the functions of the above image data producing apparatus can also be realized by the controlling device in the image forming apparatus. In this case, respective functions of the page dividing portion 10, the input processing portion 20, the input image saving portion 30, the RIP 40, the RIP controlling portion 50, and the output image saving portion 60 can be implemented by the CPU and the memory such as RAM (Random Access Memory), and the like constituting the controlling device. Also, because such control device acts as the internal apparatus of the image forming apparatus, an output controlling means for reading the produced raster image from the output image saving portion 60 under control of the RIP controlling portion 50 and supplying directly such raster image to the exposure unit of the image forming apparatus is provided in place of the I/F converting portion 70 and the image outputting portion 80.

In this case, respective embodiments and the variation can be employed not only solely but also in appropriate combination.

What is claimed is:

1. An image data producing apparatus comprising:
a page dividing portion that divides data described in a page description language into a plurality of pages;
a plurality of image processors that form raster data from the plurality of pages; and
a controlling portion that allocates the plurality of pages from which the raster data is formed to respective image processors of the plurality of the image processors, and causes each of the plurality of the image processors to execute registration of a printing resource with at least a change of the printing resource for any of the respective pages by controlling each of the plurality of the image processors irrespective of the allocation of the plurality of pages, wherein
the printing resource is a font or a form,
the plurality of image processors form the raster data and register the printing resource for allocated pages by the controlling portion, and
the plurality of image processors register the printing resource with respect to non-allocated pages by the controlling portion and do not form the raster data with respect to the non-allocated pages by the controlling portion.

2. The image data producing apparatus according to claim 1, wherein the controlling portion transmits data of the plurality of pages to the respective image processors, instructs the respective image processors to form raster data of the pages allocated by the controlling portion, and instructs each of the plurality of the image processors to execute the registration of the printing resource that is required for pages other than the pages that are allocated to said each of the plurality of image processors by the controlling portion.

3. The image data producing apparatus according to claim 1, wherein the page dividing portion detects a command for registering the printing resource in dividing the data and attaching discrimination data to the data on a page corresponding to the discrimination data, and the controlling portion instructs an image processor, to which the page is not allocated by the controlling portion, to execute the registration of the printing resource about the data on the page that has the command for registering the printing resource, based on the discrimination data.

4. An image data producing apparatus according to claim 1, wherein, under control of the controlling portion, a predetermined image processor executes only the registration of the printing resource on all pages, and remaining image processors executes formation of the raster data of the page allocated to own processors, based on information about the registration of the printing resource registered by the predetermined image processor.

5. An image data producing apparatus according to claim 4, which comprises a memory having a memory area that each of the plurality of the image processors share, wherein the predetermined image processor stores information of the registration of the printing resource in a shared memory area of the memory, and the remaining image processors execute formation of the raster data, based on information about the registration of the printing resource stored in the shared memory area of the memory.

6. The image data producing apparatus according to claim 1, wherein the plurality of the image processors notify the controlling portion that the printing resource is changed in a course of formation of the raster data, and the controlling portion copies contents in a registry area of a printing resource in a memory of a predetermined image processor into registry areas of a printing resource in memories of other image processors when the controlling portion receives a notice of change of the printing source resource from the predetermined image processor.

7. The image data producing apparatus according to claim 6, wherein the controlling portion instructs each of the plurality of the image processors again to form the raster data on pages subsequent to a page on which the printing resource is changed when the controlling portion receives a notice of change of the printing resource from the predetermined image processor.

8. An image forming apparatus comprising:

an image data producing portion that converts data described in a page description language into raster data; and an image forming portion that forms an image on a printing medium based on the raster data produced by the image data producing portion, wherein the image forming portion comprises:

a page dividing portion that divides data described in a page description language into a page unit;

a page dividing portion that divides data described in a page description language into a plurality of pages;

a plurality of image processors that form raster data from the plurality of pages; and a controlling portion that allocates the plurality of pages from which the raster data is formed to respective image processors of the plurality of the image processors, and causes each of the plurality of the image processors to execute registration of a printing resource with at least a change of the printing resource for any of the respective pages by controlling each of the plurality of the image processors irrespective of the allocation of the plurality of pages, wherein the printing resource is a font or a form, rasterization and the registration of the printing resource are performed for allocated pages, and the registration of the printing resource is performed with respect to non-allocated pages and the rasterization is not performed with respect to the non-allocated pages.

9. The image forming apparatus according to claim 8, wherein the controlling portion transmits data of the plurality of pages to the respective image processors, instructs the respective image processors to form raster data of pages allocated by the controlling portion, and instructs each of the plurality of the image processors to execute the registration of the printing resource that is required for pages other than the pages that are allocated to said each of the plurality of image processors by the controlling portion.

10. An image forming apparatus according to claim 8, wherein, under control of the controlling portion, a predetermined image processor executes only the registration of the printing resource on all pages, and remaining image processors execute formation of the raster data of the page allocated to own processors, based on information about the registration of the printing resource registered by the predetermined image processor.

11. The image forming apparatus according to claim 8, wherein the plurality of the image processors notify the controlling portion the change of the printing resource when the printing resource is changed in a course of formation of the raster data, and the controlling portion copies contents in a registry area of a printing resource in a memory of a predetermined image processor into registry areas of a printing resource in memories of other image processors, and instructs each of the plurality of the image processors again to form the raster data on pages subsequent to a page on which the printing resource is changed when the controlling portion receives a notice of change of the printing resource from the predetermined image processor.

12. A non-transitory computer readable medium storing a program causing a computer to execute a process for quickly forming a raster image from data described in a page description language, the process comprising:

dividing the data described in the page description language into a plurality of pages;

allocating the plurality of pages from which the raster data is formed to respective image processors of a plurality of image processors;

executing, by each of the plurality of image processors, registering of a printing resource with at least a change of the printing resource for any of the respective pages by controlling each of the plurality of image processors irrespective of the allocation of the plurality of pages, copying contents in a registry area of a printing resource in a memory of a predetermined image processor into registry areas of a printing resource in memories of other image processors, and instructing each of the plurality of image processors again to form the raster data on pages subsequent to a page on which the printing resource is changed when the printing resource is changed in the predetermined image processor; and transmitting the raster data of respective pages formed by the plurality of image processors to an image forming apparatus to keep a management in order of page, wherein the printing resource is a font or a form, the plurality of image processors form the raster data and register the printing resource for allocated pages, and the plurality of image processors register the printing resource with respect to non-allocated pages and do not form the raster data with respect to the non-allocated pages.

13. The image data producing apparatus according to claim 1, wherein the registration of the printing resource is performed with respect to the non-allocated pages in which the printing resource is changed and the registration of the printing resource is not performed with respect to the non-allocated pages in which the printing resource is not changed.

14. The image data producing apparatus according to claim 1, wherein the printing resource is registered into a memory in the registration of the printing resource.

15. The image data producing apparatus according to claim 1, wherein the printing resource is downloaded and registered into a memory in the registration of the printing resource.

* * * * *